United States Patent
Tomita et al.

(10) Patent No.: US 6,891,625 B2
(45) Date of Patent: May 10, 2005

(54) OPTICAL REFLECTION SENSOR (75) Inventors: Kohei Tomita, Kyoto (JP); Kiyoshi Imai, Kyoto (JP); Naoya Nakashita, Kyoto (JP); Hiroyuki Inoue, Kyoto (JP)

(73) Assignee: OMRON Corporation, Kyoto (JP)

( * ) Notice: Subject to any disclaimer, the term of this patent is extended or adjusted under 35 U.S.C. 154(b) by 217 days.

(21) Appl. No.: 10/109,568

(22) Filed: Mar. 27, 2002

(65) Prior Publication Data

US 2002/0171848 A1 Nov. 21, 2002

(30) Foreign Application Priority Data

Mar. 30, 2001 (JP) .......................................... 2001-099313

(51) Int. Cl.$^7$ ............................................. G01B 11/24
(52) U.S. Cl. ........................................ 356/601; 356/623
(58) Field of Search ................................. 356/601, 602, 356/614, 615, 623

(56) References Cited

U.S. PATENT DOCUMENTS 6,496,270 B1 * 12/2002 Kelley et al. ............... 356/602
6,529,280 B1 * 3/2003 Yahashi et al. ............. 356/602

* cited by examiner

Primary Examiner—Richard A. Rosenberger
Assistant Examiner—Vincent P. Barth
(74) Attorney, Agent, or Firm—Beyer Weaver & Thomas LLP (57) ABSTRACT

An optical reflection sensor emits light and its reflection from a target object is received. A signal processor carries out a measurement on the received reflected light such as the distance to the target object each time the reflected light is received. Repeatability of measured values is calculated and displayed on a display device incorporated into the housing of the sensor. The display device may have two display areas such that the calculated repeatability and the measured value can be displayed simultaneously. The calculated repeatability may be compared with a specified threshold value, with the result of the comparison displayed. The housing may also incorporate an input device through which a required level of accuracy may be set.

10 Claims, 6 Drawing Sheets

OPTICAL REFLECTION SENSOR

BACKGROUND OF THE INVENTION

This invention relates to an optical reflection sensor, or a sensor of the type for receiving light reflected from a target object, processing the received light to make a measurement on the target object and outputting the result of this measurement.

Examples of an optical sensor of this type include distance sensors for measuring the distance to a target object and displacement sensors for measuring displacements on a target surface. Prior art displacement sensors are provided with a light source such as a laser diode and a light receiving element such as a PSD (position sensitive device) and a CCD, emitting and receiving light at a specified timing, extracting the focusing position of reflected light on the light receiving surface of the light receiving element according to the timing of light emission and reception and measuring the distance to the target object by using the focusing position by triangulation. Such a displacement sensor may output as its result of measurement the distance to the target object itself or the result of a comparison between the measured distance and a threshold value.

With a sensor of this type, the result of measurement fluctuates delicately, caused by the fluctuations in the analog output from the light receiving element. In the case of a displacement sensor using a PSD as its light receiving element, the distance to a target object is measured on the principle that the relationship between two analog outputs from the PSD changes, depending on the position of incidence of the reflected light. If there is a change in the quantity of reflected light making incidence into the light receiving element, however, the relationship between the two outputs also changes even if reflected light makes incidence at the same position and the measured value fluctuates.

In view of such a problem, it has been known to output an average of a number of measured values obtained while light is emitted and received for a specified number of times such that the accuracy of measurement can be stabilized. It is known that the stability of such averaged data increases as the number of measured values to be averaged is increased. Makers define the accuracy of measurements obtained from averaged data as the repeatability and show to the user the response time, or the time required to obtain a standard level of repeatability. In order to obtain a desired level of accuracy in measurement, the user will adjust the response time or the time to move the target object on the basis of this repeatability.

In general, the repeatability is obtained by test measurements with a white alumina ceramic plate or the like as a target object but since the reflection of light changes, depending on the actual reflectivity, shape and surface roughness of the object, as well as the position of measurement, it cannot easily be expected to obtain the same accuracy of measurement as indicated by the maker.

In order to overcome this problem, it is necessary to keep observing the repeatability of measurements while making these measurements on an actual target object. In order to thus keep observing the repeatability, however, a sensor must be connected to an external device such as a recorder, an oscilloscope and a personal computer. Thus, the process becomes complicated and the operation cost becomes higher. If there is not enough room for setting such external devices near the sensor, furthermore, it is difficult to observe the repeatability in correlation with the condition of the measurement. Even if the repeatability is obtained while a target object is being measured, the measurement may have to be repeated if the reflectivity or the surface roughness of the target object changes, say, because a white target object is replaced by a black object. These are but a few causes of making the processing complicated.

SUMMARY OF THE INVENTION

It is therefore an object of this invention in view of these problems described above to provide an improved sensor having means for calculating the repeatability of measured values and displaying the calculated repeatability on the body of the sensor such that the repeatability as the target object is measured can be easily observed at the position of the sensor.

Another object of this invention is to provide a sensor of the type adapted to output the result of comparison between a measured value and a specified threshold value, having means for setting an optimum "threshold width" for a target object by using the repeatability obtained within the sensor such that the accuracy of judgment is improved. In general, a sensor of this type is switched on when the quantity of light received thereby is increased and becomes higher than a specified (first) threshold value and is switched off when the quantity of light received thereby is decreased and becomes less than another specified (second) threshold value. The first threshold is usually set higher than the second threshold value for preventing chattering. The difference therebetween is hereinafter referred to as the threshold width.

A third object of this invention is to provide a sensor adapted to automatically set the number of measured values which are individually obtained from reflected light and are to be averaged to obtain a result of measurement such that the convenience is improved.

This invention relates not only to displacement sensors of the types described above but also to sensors of many other kinds for making use of light reflected from a target object such as sensors adapted to emit light including three basic colors and to judge the color of a target object from the reflected light. Many of such sensors are separately comprised of a light source, a light receiving element, a detector for generating a detection signal indicative of the received light and a signal processor for carrying out calculations by using the signal from the detector. The invention, however, is not limited to sensor of such a structure. The sensor may have its detector and signal processor integrated into a single unit.

A sensor according to an embodiment of this invention may be characterized as comprising a display means on the sensor body, calculating means for calculating the repeatability of measured values obtained by a plurality of measurements as these measurements are being taken and a display control means for causing the result of calculation of the repeatability on the display means.

In the above, "measured value" means the value that is obtained during each of specified time periods. If a plurality of cycles of light emission and reception processes are carried out within this specified time period, the "measured value" is the value obtained by averaging the individual measured values (such as the distance value obtained from the position of incidence of reflected light on the light receiving element in the case of a displacement sensor) with reflected light of each cycle. "Repeatability" is for showing the degree of variations of measured values obtained by a plurality of measurements. The largest and smallest of measured values may be extracted to obtain their difference and this difference may be defined as the repeatability.

The result of measurement to be outputted may be the measured value itself but it may also be a result of a comparison between the measured value and a specified threshold value. When it is the height of a step or a thickness that is being measured and a measured result from another sensor is retrieved and used for a calculation, a result of such calculation may be outputted as the result of measurement. The expression "output" should also be interpreted broadly. The output within the meaning of this invention includes not only an output to an external device but also a display made on the aforementioned display means on the main body of the sensor.

With a sensor thus structured, the repeatability of measurement is displayed on the display device while the user is actually carrying out measurements on a target object. Thus, the user can readily ascertain the accuracy of the measurement being carried out.

According to a preferred embodiment, the display device has at least two display areas and the display control means is set such that the repeatability and the result of measurement can be displayed simultaneously. With the display means thus set, the user can ascertain the result of the measurement process and the repeatability at the same time at the place of the measurement. The repeatability and the result of measurement may be displayed by their numerical values or in terms of the result of comparison with a specified level. In situations where it is not possible to provide two display areas, the two displays may be shown sequentially. If a display switch is provided somewhere on the body of the sensor, the user may be able to switch the content of display by operating on such a switch. It may be arranged to switch the display automatically.

If the sensor outputs an average value calculated by averaging a specified number of measured values from the reflected light or the result of comparing such an average with a specified threshold value, the sensor may be provided with an input device for setting the number of data to be averaged. With such a structure, conditions of measurement may be changed at the place of the measurement if the repeatability displayed on the display means does not reach the level required by the user such that the repeatability can be improved.

A sensor according to another embodiment of the invention may be characterized as comparing the result of measurement with a specified threshold value and outputting the result of such comparison, comprising means for calculating repeatability of measured values obtained by a plurality of measurements and means for setting the threshold width on the basis of the calculated repeatability. The threshold value for the comparison may be entered through an input device or by receiving data transmission from an external device. It is preferable to make the setting by taking an average of measured values used for the calculation of repeatability.

A sensor according to still another embodiment of the invention may be characterized as comprising an input device through which a required level of accuracy for outputted result of measurement, means for carrying out an averaging process for averaging a specified number of measured values obtained from each of the reflected light while varying this specified number, and accuracy calculating means for calculating repeatability of a plurality of the averaged measured values, and continuing the specified measurement at least until the calculated repeatability reaches the required accuracy level set through the input device. In the above, "measured values obtained from each of the reflected light" means those values obtained during one cycle of light emission and reception. With a sensor thus structured, the user sets the required accuracy level for averaged measured value and an optimum number of data for averaging can be automatically obtained such that the set level of accuracy can be attained. Thus, an accuracy suitable for the purpose of each measurement can be obtained. Since this setting can be carried out on an input device on the housing of the sensor, the user can easily set the conditions of measurement at the place of the measurement.

According to a preferred embodiment, a sensor further comprises means for setting the number of the averaged measured values when the calculated repeatability reaches the required accuracy level as the specified number when the averaging process is carried out next. When similar target objects are continuously measured, for example, the accuracy level initially set by the user can thus be maintained for the subsequent measurements.

The sensors according to this invention may further include an output device for outputting the calculated repeatability to external devices. When a personal computer is used to carry out a more complicated measurement process by using an output from such a sensor, calculations may be carried out according to the accuracy of such an output. Means for comparing the calculated repeatability with a specified level and means for outputting an alarm signal when the repeatability has crossed a specified level may also be provided. Such means for outputting an alarm may comprise a lamp set at an appropriate position on the sensor housing or the alarm signal may be outputted to an external device such as a buzzer or to a personal computer to have an error message displayed.

DETAILED DESCRIPTION OF THE INVENTION

Figure 1:
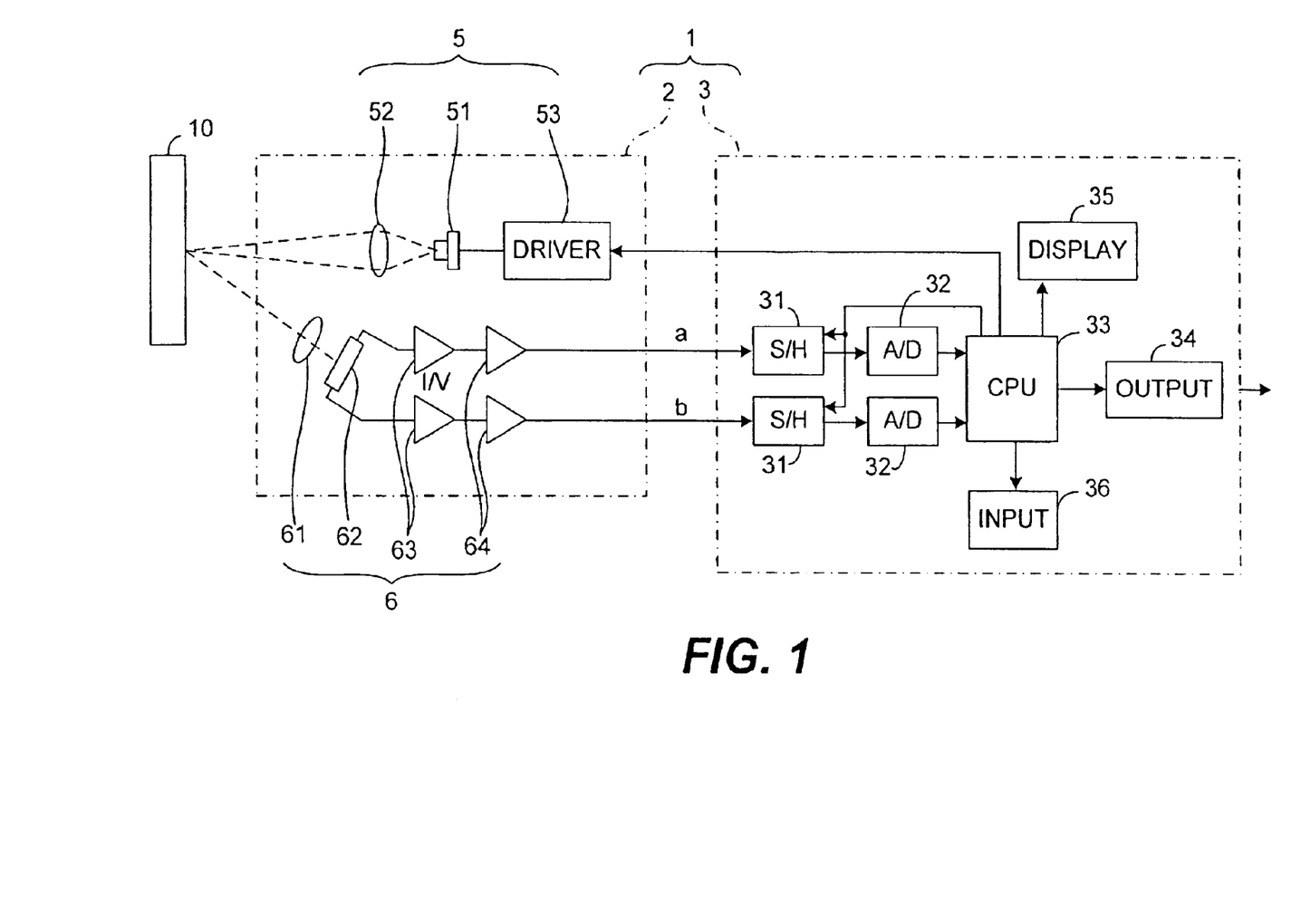
FIG. 1 is a block diagram of a displacement sensor embodying this invention.

FIG. 1 shows a displacement sensor 1 embodying this invention, comprising a detector 2 having a light emitter 5 and light receiver 6 incorporated therein and a signal processor 3 for carrying out a series of measurement processes. The detector 2 and the signal processor 3 are separate components and are electrically connected to each other by a cable. The light emitter 5 includes a laser diode 51, a light emission lens 52 and a driver circuit 53 for the laser diode 51. The light receiver 6 includes a light receiving lens 61, a PSD 62 and a pair of current-voltage conversion circuits 63 and a pair of amplifier circuits 64 set individually for two detection signals from the PSD 62.

The signal processor 3 includes not only a sample-and-hold circuit 31 and an A/D conversion circuit 32 for each of the two detection signals but also a CPU 33, an output circuit 34, a display device 35 and an input device 36. The display device 35 is for displaying results of measurement and the repeatability (to be described below). The input device 36 is used for setting an operation mode or inputting the number of data to be averaged and the required accuracy (to be described below). The output circuit 34 is for outputting the results of measurement to an external device such as a personal computer or a PLC and includes a D/A conversion circuit and an interface to external devices. Connection to external devices, however, is not a necessary element of the present invention. It may be provided only when necessary.

With the sensor 1 thus structured, the driver circuit 53 of the light emitter 5 drives the laser diode 51 in response to a timing signal from the CPU 33, causing light to be emitted towards a target object 10. Reflected laser light from the surface of the target object 10 is received by the PSD 62, and two detection signals a and b with different intensities are outputted, depending on the position of incidence. The CPU 33 causes each of the sample-and-hold circuits 31 to sample the corresponding one of the detection signals a and b in synchronism with the timing of the light emission. Thereafter, the sampled signals are converted to digital signals by the A/D conversion circuits 32 and taken into the CPU 33, and the distance L to the target object 10 is calculated.

The CPU 33 further serves to carry out an averaging process on the measured values corresponding to each cycle of light emission and reception, to identify the result of this calculation as the result of the measurement and to calculate the repeatability of these results of calculation. These results of measurement and the repeatability are displayed on the display device 35 and also outputted through the output circuit 34 to external devices.

Figure 2:
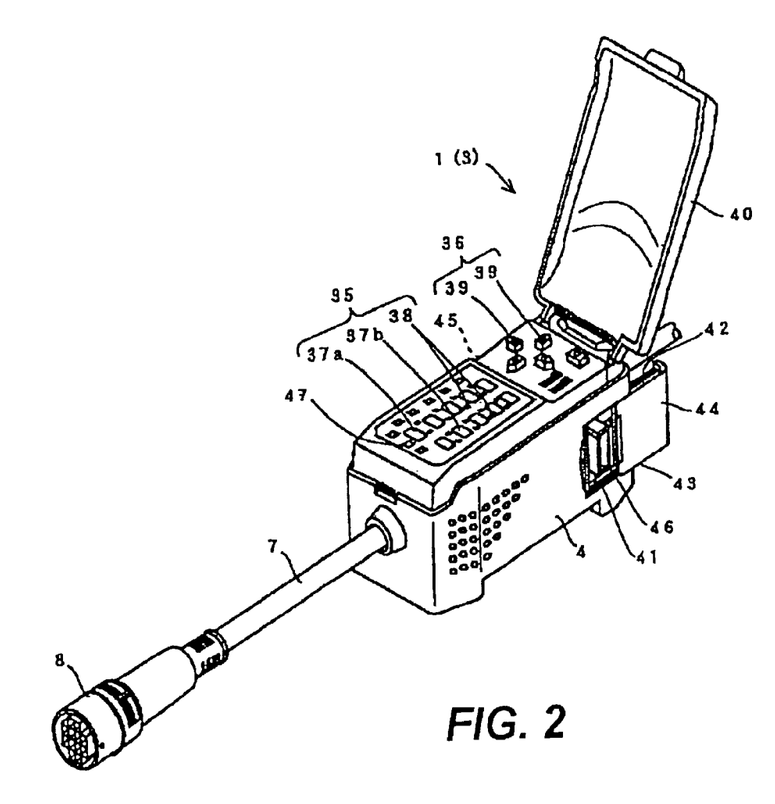
FIG. 2 is an external diagonal view of the signal processor shown in FIG. 1.

FIG. 2 shows the signal processor 3 of the sensor 1 of FIG. 1, comprising a housing 4 containing a base board (not shown) on which the circuits shown in FIG. 1 are mounted. The display device 35 and the input device 36 are formed on the upper surface of the housing 4 and covered by a lid 40 which may be opened or closed. A cord line 7 extends from a side surface of the housing 4, and a connector 8 is attached to the opposite end of this cord line 7 for an electrical connection.

The input device 36 has many push buttons 39 or the like for inputting various numerical values and selecting an operation mode. The display device 35 has a plurality of digital display devices 37a and 37b of the type capable of variably displaying numerical and alphabetical symbols respectively in a row such that two kinds of data can be displayed simultaneously. Lamps 38 for displaying a decimal point are provided in each of the rows for these digital display devices 37a and 37b (as shown more clearly in FIG. 4). There are also other warning lamps 47 around the digital display devices 37a and 37b.

On both side surfaces of the housing 4 are openings 41 for connectors 45 and 46 for signal transmission. Each opening 41 is provided with a slidable cover part 44 engaged through guide grooves 42 and 43. These connectors 45 and 46 are for making connections to the signal processor of another displacement sensor when the step height or the thickness of a target object is to be measured and signals need to be exchanged with such other displacement sensor. If the application does not require such a connection to another sensor, the openings 41 may be closed by the cover parts 44.

Figure 3:
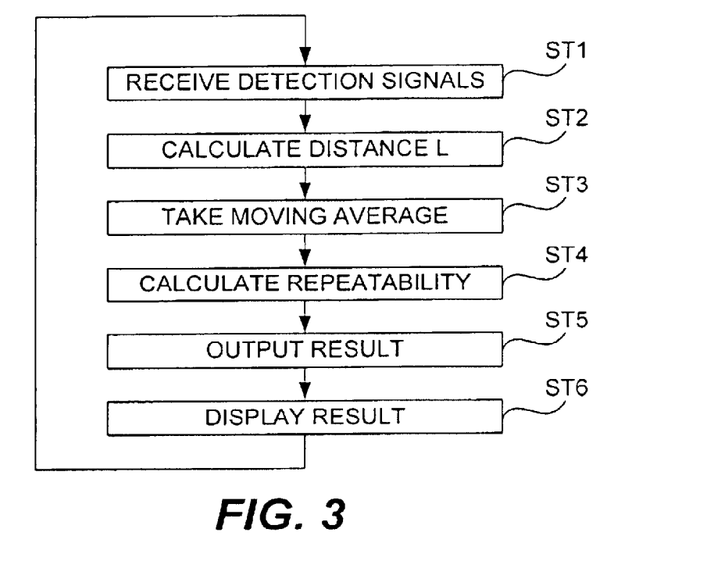
FIG. 3 is a flowchart of the measurement process carried out by the signal processor.

The process carried out by the CPU 33 for measuring the distance to the target object 10 by means of the sensor 1 is explained next by way of the flowchart of FIG. 3 which shows the routine corresponding to one cycle of light emission and reception. This routine is repeated while the detector 2 and the signal processor 3 are in operation.

After digitally converted detection signals A and B are received (Step ST1), the distance L to the target object 10 is calculated as $L=KA/(B+\beta A)$ where K and $\beta$ are constants (Step ST2). This formula is derived because the relationship between the changes in the position of incidence of reflected light and the distance L to the target object 10 as shown by the detection signals A and B is not linear. The distance L thus calculated is stored in a memory device (not shown). The distance values L thus obtained for the past P times are used to calculate an average value (Step ST3). The average values thus obtained (herein referred to as the running average) are also stored after each cycle in the memory device. The maximum and the minimum among the stored N running averages are identified and a repeatability value is calculated by taking their difference (Step ST4).

Figure 4:
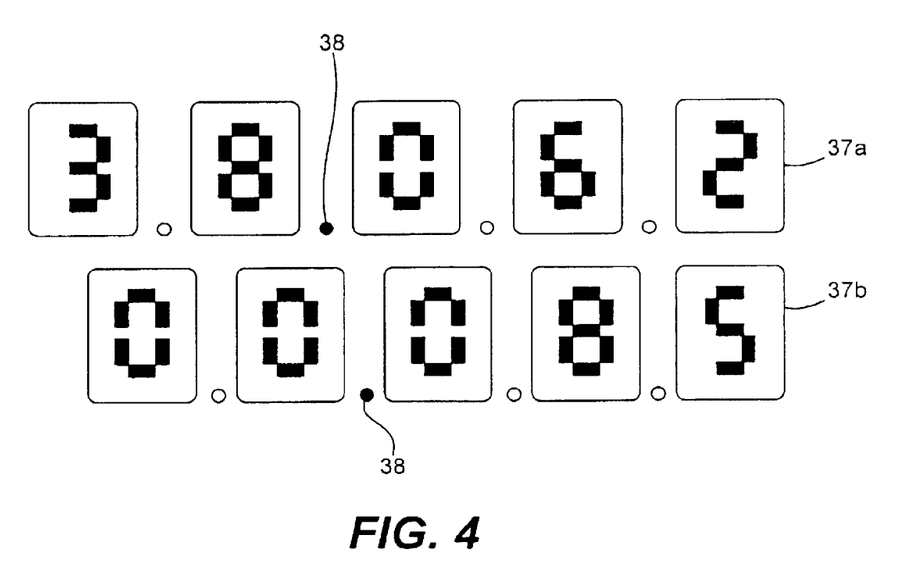
FIG. 4 is an example of display on the display device.

After the running averages and the repeatability are thus calculated, they are outputted to external devices through the output circuit 34 (Step ST5). These results of calculations are also transmitted to the display device 35 to be displayed thereon (Step ST6). FIG. 4 is an example of a display thus made on the display device 35. According to this example, the digital display devices of the upper row 37a for showing the running average value are made slightly larger than those of the lower row 37b for showing the repeatability. Appropriate ones of the lamps 38 are lit to indicate decimal points.

It now goes without saying that the structure of the display device 35 is not required to be as shown in FIG. 4. A liquid crystal panel may be used for the same purpose. If it is not practically possible to display two kinds of data simultaneously, say, because of the available area, it may be so arranged that these two kinds of data are displayed alternately.

In summary, the user with this sensor 1 can continue a measurement on the target object 10 while calculating the repeatability of running averages which are outputted as results of the measurement and have the results of these calculations displayed together with the results of the measurement. Thus, the user can simultaneously ascertain both the results of the measurement and the repeatability at the position of the sensor and come to understand the level of accuracy of the current results of the measurement on the target object 10.

If the displayed repeatability does not satisfy the user's requirement, it is possible to improve the level of repeatability by operating on the input device 36 to change the number P of data for use in the averaging process. Since the user can thus easily modify the conditions of measurement right at the site of the measurement, adjustments can be made quickly when the circumstances change.

It is preferable to arrange such that the user can quickly identify a situation when the repeatability is not satisfying a desired condition. This may be done by preliminarily inputting a desired level of repeatability through the input device 36 and causing a warning lamp 47 to be lit when the calculated repeatability becomes greater than the inputted level.

When the displacement sensor 1 described above is used to determine whether or not the height of the target object 10 satisfies a certain condition, it may be set so as to compare the running average of the distance L with a specified threshold value and display both the result of comparison and the repeatability. When a comparison is made with a specified threshold value, it is preferable to preliminarily make measurements on the target object 10 at the distance corresponding to the threshold value and to thereby obtain the corresponding repeatability. A more accurate comparison is possible if the threshold width is set on the basis of the repeatability value.

Figure 5:
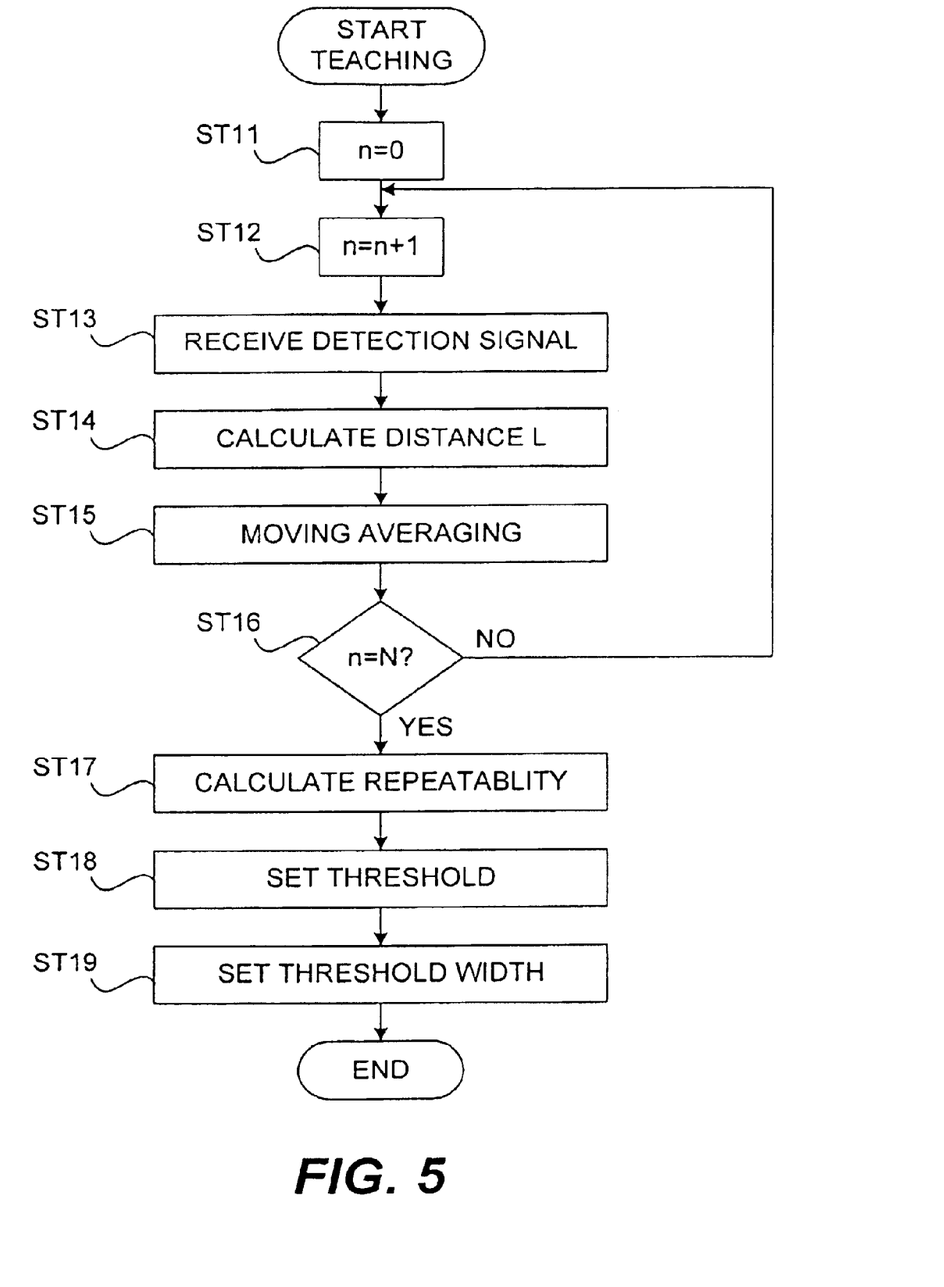
FIG. 5 is a flowchart of a routine for setting a threshold value and the threshold width.

FIG. 5 shows a routine for setting a threshold value and the threshold width as explained above. Before starting this routine, the user places a model of the target object 10 at a reference distance from the detector 2 and operates on the input device 36 to set the signal processor 3 in a teaching mode. The CPU 33 will respond by carrying out a specified number of cycles of light emission and reception. For each cycle, the distance L is calculated and stored in the memory device. As the routine shown in FIG. 5 is started, a counter n is initially set to zero (Step ST11), and then increased by 1 (Step ST12). Digitally converted detection signals A and B are then obtained (Step ST13) and a distance value L is calculated therefrom by using the formula shown above (Step ST14). The CPU 33 then calculates the running average of the past P distance values (Step ST15) as done by the routine shown in FIG. 3. Steps ST13–ST15 are repeated until the counter n reaches a specified number N (YES in Step ST16) and N running averages have been obtained. The repeatability is then calculated from these N running averages (Step ST17).

Next, a threshold value is calculated by averaging the running averages which have thus far been obtained (Step ST18). The threshold value thus obtained is also stored in the memory device. Thereafter, the threshold width is determined from the repeatability obtained in Step ST17 (Step ST19). This may be done by multiplying the range of numerical values shown by the repeatability by a certain number greater than 1 (such as 1.5–2) such that data within a range of error from the threshold value can be identified.

In summary, the threshold width is determined in this example according to the repeatability obtained from the results of measurements on an actual target object. Thus, the threshold width can be varied according to the type of the target object and hence a judgment with a high level of accuracy is possible.

FIG. 5 shows a routine for determining only one threshold value. If it is desired to extract target objects for which results of measurements fall within a certain range such that two or more threshold values are required, the routine as shown in FIG. 5 may be repeated for each threshold value to determine an appropriate threshold width.

Figure 6:
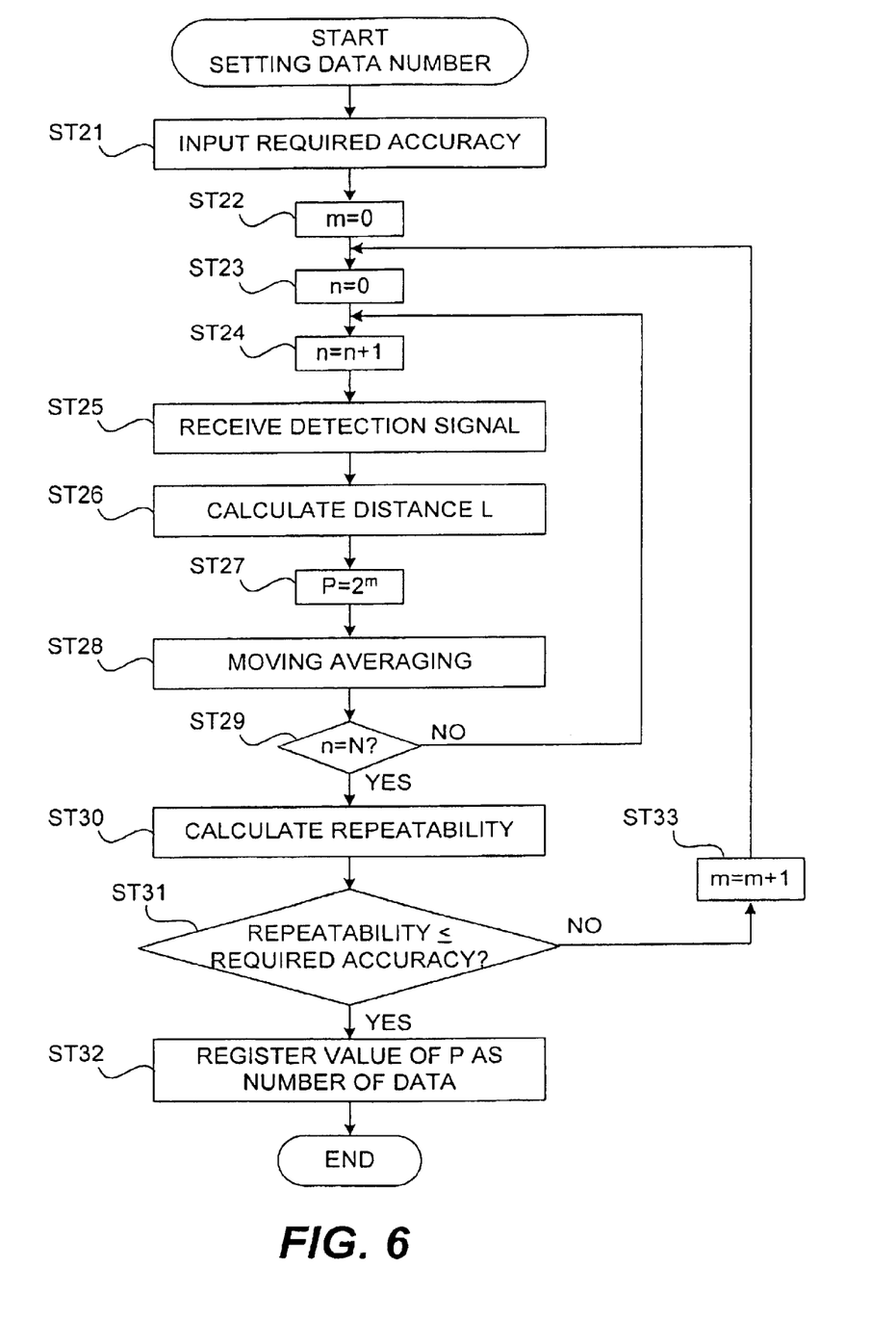
FIG. 6 is a flowchart of a routine for determining the number of data to be averaged.

The displacement sensor 1 may also be so arranged as to allow the user to specify a desired level of accuracy through the input device 36 and to automatically set the number P of data for averaging over according to this inputted level of accuracy (herein referred to as the required accuracy). FIG. 6 shows a routine for this process.

After the required accuracy is inputted through the input device (Step ST21), counters m and n are both initialized to zero (Steps ST22 and ST23) and counter n is increased by 1 (Step ST24). Thereafter digital detection signals A and B are taken in (Step ST25) and a distance value L is calculated as above (Step ST26). Next, the number P of data to be averaged over is set equal to $2^m$ (Step ST27), and then the running average is calculated over the past P number of distance values L (Step ST28). In the initial cycle, $P=2^0=1$ and hence the running average is the same as the measured distance L itself.

Steps ST25–ST28 are then repeated as the value of n is incremented by 1 until it reaches a specified number N (YES in Step ST29) and the repeatability is calculated from the N number of running averages (Step ST30). Next, a comparison is made between the repeatability obtained in Step ST30 and the requested accuracy inputted initially in Step ST21 (Step ST31). If the calculated accuracy is greater than the required accuracy (NO in Step ST31), counter m is incremented by 1 (Step ST33) and the routine goes back to Step ST23 to reset the counter n to 0 and Steps ST24–29 are repeated by increasing the number P of data to be averaged. If the calculated accuracy becomes less than the required accuracy (YES in Step ST31), the number P of data at this point is stored in the memory device as the number of data (Step ST32). When the required accuracy is initially inputted in Step ST21, it is desirable to automatically display this inputted value such that the user can visually ascertain the value.

The routine shown in FIG. 6 is advantageous because the number P of data to be averaged can be automatically fixed such that the level of accuracy required by the user can be maintained when a similar target object is measured on another occasion. Moreover, since this setting is done at the position of the sensor, the number P can be reset whenever the type of target object is changed.

When results of measurements from another sensor are taken in through the connector 45 or 46, too, the repeatability can be calculated as explained above with reference to FIG. 3 and outputted or displayed.

Figure 7:
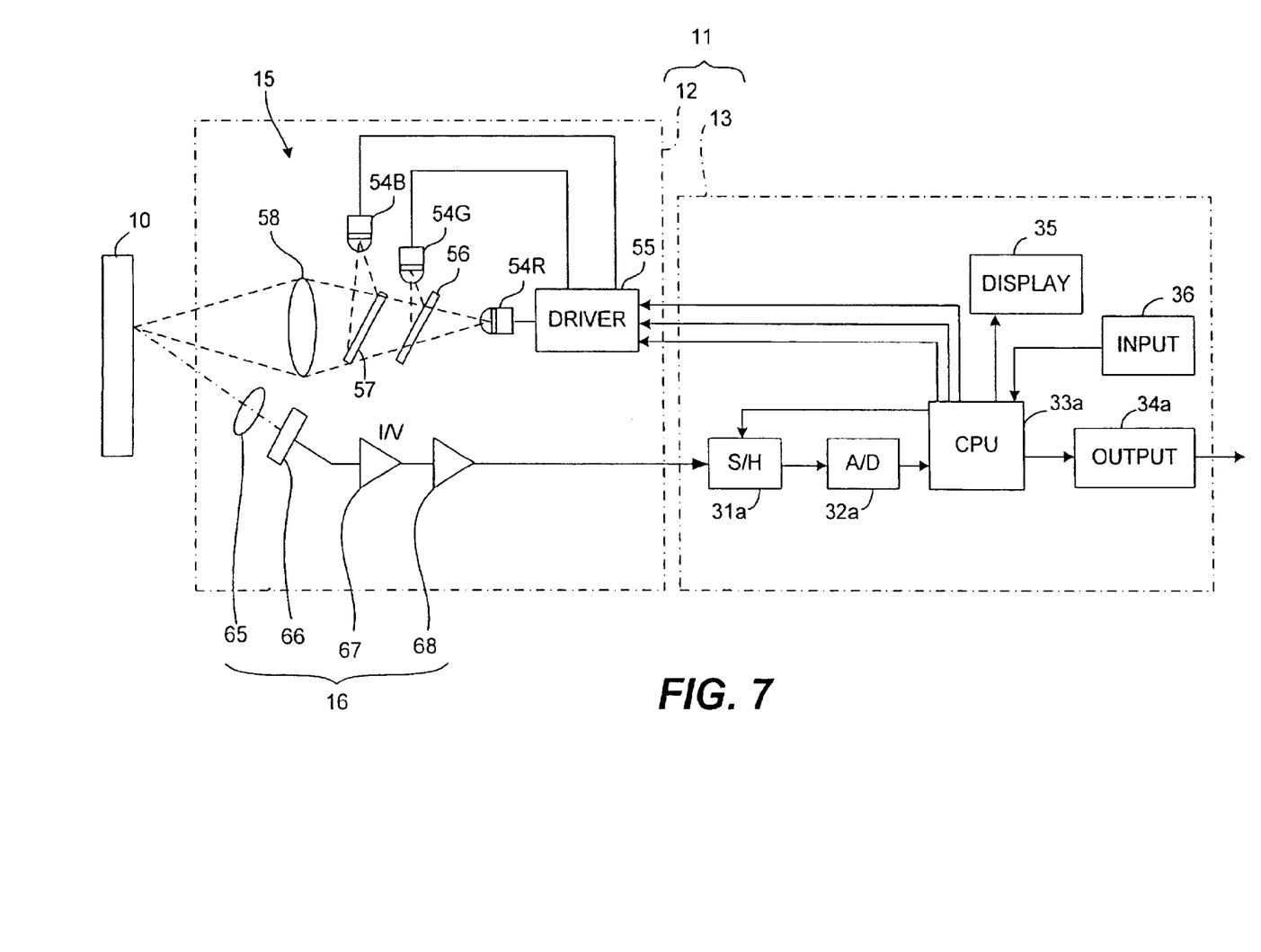
FIG. 7 is a block diagram of a color sensor embodying this invention.

The process of calculating the repeatability described above is applicable not only to a displacement sensor but also to an optical reflection sensor of all kinds such as a color sensor for identifying the color of a target object. FIG. 7 shows such a color sensor 11 incorporating the function of calculating the repeatability embodying this invention, also having a detector 12 and a signal processor 13 separately formed and electrically connected to each other.

The detector 12 contains a light emitter 15 comprised of three LEDs 54R, 54G and 54B for emitting red, green and blue light, respectively, a driver circuit 55 therefor, two dichroic mirrors 56 and 57 and a light emitting lens 58. The red LED 54R is disposed such that its optical axis is directed to the center of the surface of the light emitting lens 58. The green and blue LEDs 54G and 54B are disposed such that their optical axes will be perpendicular to that of the red LED 54R. The dichroic mirrors 56 and 57 are disposed where the optical axes of the green and blue LEDs 54G and 54B cross that of the red LED 54R such that the wavelength range of the light from the LEDs 54R, 54G and 54B can be selected.

The detector 12 also contains a light receiver 16 which is comprised of a light receiving lens 65, a photodiode 66, a current-voltage conversion circuit 67 and an amplifier circuit 68.

The signal processor 13 includes a CPU 33a, a sample-and-hold circuit 31a for receiving detection signals from the detector 12, an A/D conversion circuit 32a for converting the detection signals from the sample-and-hold circuit 31a to obtain digital detection signals, an output circuit 34a, a display device 35 and an input device 36. The CPU 33a outputs a timing signal to the driver circuit 55 of the light emitter 15 and to the sample-and-hold circuit 31a individually for the three LEDs 54R, 54G and 54B. In response to the received timing signal, the driver circuit 55 causes the LEDs 54R, 54G and 54B to emit light sequentially. The sample-and-hold circuit 31a responds similarly to the received timing signal to take in the detection signals corresponding to the light emission from the LEDs 54R, 54G and 54B and to transmit them to the A/D conversion circuit 32a.

The CPU 33a receives the digitally converted detection signals R, G and B and calculates as follows the proportions X, Y and Z of red, green and blue on the surface of the target object 10: X=R/(R+G+B), Y=G/(R+G+B) and Z=B/(R+G+B). The CPU 33a further compares the values of X, Y and Z thus calculated individually with a corresponding one of specified threshold values and outputs the results of the comparisons to the display device 35 to have them displayed.

The averaged data obtained individually for X, Y and Z by running averaging may be outputted as results of the measurement. As explained above with reference to FIG. 3, repeatability may be calculated from these averaged data and displayed on the display device 35 together with the results of comparison with a threshold value either simultaneously or sequentially, as explained above. When the threshold values for comparing with the values of X, Y and Z are stored, the repeatability may be calculated for each and an optimum threshold width may be determined for each threshold value by the same method explained above with reference to FIG. 5.

As explained above with reference to FIG. 6, furthermore, required accuracy values may be inputted by the user such that the number of data to be averaged for each of data X, Y and Z can be automatically set. In the application, it is preferable to calculate repeatability while varying the number of data to be averaged by the method described above with reference to FIG. 6 such that the numbers of data are determined when repeatability values for all three colors satisfy the required condition.

In summary, an optical reflection sensor according to this invention calculates the repeatability of measured values as these measured values are obtained on a target object and the calculated value is displayed on the display device incorporated in the housing of the sensor, thereby allowing the user to ascertain the accuracy of the measurements being taken not only immediately but also at the position of the sensor. When the result of measurement is compared with a threshold value and the result of the comparison is outputted, the threshold width is determined optimally on the basis of the calculated repeatability such that the accuracy of measurement can be significantly improved. When a plurality of measured values are averaged and outputted as a result of measurement, the number of measured values to be averaged can be automatically determined according to the required accuracy inputted by the user. Thus, measurements can be carried out according to the required level of accuracy.

What is claimed is:

1. An optical reflection sensor comprising:
   a light emitter for emitting light towards a target object;
   a light receiver for receiving reflected light from said target object; and
   a signal processor for carrying out a specified measurement on the reflected light received by said light receiver, making a comparison between the result of said measurement and a specified threshold value and outputting a result of said comparison, said signal processor including:
   accuracy calculating means for calculating repeatability of measured values obtained by a plurality of said measurements; and
   setting means for setting a threshold width on the basis of the calculated repeatability.

2. The optical reflection sensor of claim 1 further comprising an output device for outputting said calculated result of repeatability to an externally connected device.

3. The optical reflection sensor of claim 1 further comprising:
   comparing means for making a comparison between said calculated result of repeatability and a specified set level; and
   warning means for outputting a specified warning signal, depending on result of said comparison.

4. The optical reflection sensor of claim 1 wherein said light receiver includes a light receiving element outputting a pair of analog signals indicating the position of incidence of said reflected light, said optical reflection sensor including distance calculating means for calculating a distance to said target object by using said pair of analog signals.

5. An optical reflection sensor comprising:
   a light emitter for emitting light towards a target object;
   a light receiver for receiving reflected light from said target object; and
   a signal processor for carrying out a specified measurement on the reflected light received by said light receiver and outputting a result of said measurement; said signal processor including:
   an input device for setting a required accuracy level for the outputted result of said measurement;
   averaging means for carrying out an averaging process for averaging a specified number of measured values obtained from each cycle of said reflected light while varying said specified number; and
   accuracy calculating means for calculating repeatability of a plurality of the averaged measured values;
   said signal processor being adapted to continue said specified measurement at least until the calculated repeatability reaches said required accuracy level set through said input device.

6. The optical reflection sensor of claim 5 wherein said signal processor further includes means for setting the number of the averaged measured values when said calculated repeatability reached said required accuracy level as said specified number when said averaging process is carried out next.

7. The optical reflection sensor of claim 5 further comprising an output device for outputting said calculated result of repeatability to an externally connected device.

8. The optical reflection sensor of claim 5 further comprising:
   comparing means for making a comparison between said calculated result of repeatability and a specified set level; and
   warning means for outputting a specified warning signal, depending on result of said comparison.

9. The optical reflection sensor of claim 5 wherein said light receiver includes a light receiving element outputting a pair of analog signals indicating the position of incidence of said reflected light, said optical reflection sensor including distance calculating means for calculating a distance to said target object by using said pair of analog signals.

10. A method of making a measurement on a target object, said method comprising the steps of:
    emitting light towards said target object;
    receiving reflected light from said target object;
    carrying out specified measurements on the reflected light received from said target object to obtain measured values;
    specifying a number;
    outputting a result selected from the group consisting of an average value calculating by averaging said specified number of said measured values and a result of comparison of said average value with a specified threshold value;

calculating repeatability of said measured values; and causing the calculated result of said repeatability to be displayed on a display device.

* * * * *